United States Patent [19]

Wisman

[11] 4,010,411
[45] Mar. 1, 1977

[54] POWER CONVERSION APPARATUS

[75] Inventor: Franklin O. Wisman, Chambersburg, Pa.

[73] Assignee: T. B. Wood's Sons Company, Chambersburg, Pa.

[22] Filed: Aug. 13, 1975

[21] Appl. No.: 605,621

[52] U.S. Cl. .................................. 323/4; 318/317; 318/331; 318/332; 318/345 R; 323/9; 323/20; 323/34

[51] Int. Cl.² .......................................... H02P 5/16

[58] Field of Search .......... 318/317, 331, 332, 345; 323/4, 20, 22 SC, 34

[56] References Cited

UNITED STATES PATENTS

| 3,373,331 | 3/1968 | Dow | 318/317 X |
| 3,555,386 | 1/1971 | Wisman | 318/317 |
| 3,617,844 | 11/1971 | Grygera | 318/331 |

Primary Examiner—A. D. Pellinen
Attorney, Agent, or Firm—B. P. Fishburne, Jr.

[57] ABSTRACT

An improved motor control system in which cooperative interaction of a simplified programmed IR compensation structure and economical thermally compensated speed reference-error comparator combination result in an improved polluted power notch-immune synchronizing performance achieved with economy of components and incidental heating.

24 Claims, 2 Drawing Figures

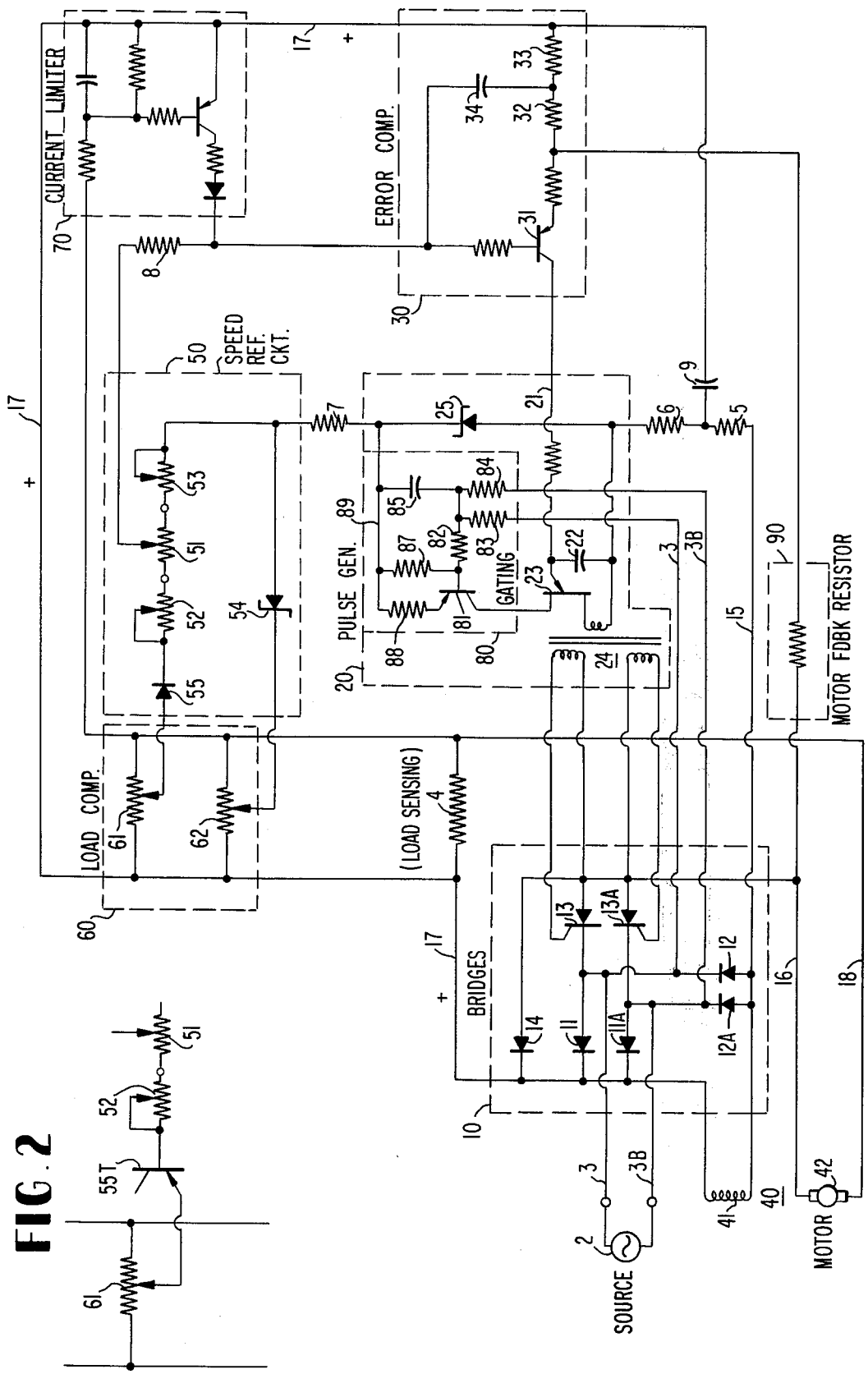
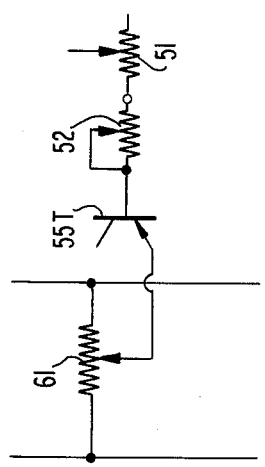
FIG. 1
FIG. 2

POWER CONVERSION APPARATUS

BACKGROUND OF THE INVENTION

Solid state electronic controls for direct current electric motors are known in the prior art and several examples of the patented prior art are contained in U.S. Pat. Nos. 3,555,386, Wisman; 3,614,569, Reinert; and 3,697,844, Dinger.

The present invention has for its objective to improve upon the prior art by the provision of DC motor control means having improved economy of manufacture and operation, as well as increased efficiency and reliability in practical applications.

SUMMARY OF THE INVENTION

The invention relates to power conversion apparatus for adjustable speed control of DC motors of the type in which armature voltage is adjusted by means of phase controlled thyristors. Such an apparatus is fully described in the above-referenced Wisman prior U.S. Pat. No. 3,555,386.

It is customary to employ armature terminal voltage as a measure of achieved speed for closed loop feedback together with compensation for the internal voltage drop (IR compensation). However, IR compensation tends to be imperfect for several reasons. Phase control inherently tends to be less sensitive at large angles associated with higher voltages and speeds. Also, the internal losses and apparent voltage drop in the motor tend to vary with speed. These effects are even more aggravated in small or inexpensive motors. Both effects work to degrade motor performance and to require different compensation factors for high and low speeds. Therefore, it is a particular object of this invention to provide a programmable compensation response more economically than in prior art constructions which are capable of approaching equivalent performance.

Another object is to achieve thermal compensation for holding set speeds steady in the face of changing control temperatures more economically than heretofore.

Another object is to render the control system immune to malfunctions caused by momentary interruption or aberration of supply line voltage commonly known as "line notching" or "ringing".

Still another object of the invention is to reduce losses and heating incident to powering of the control circuitry.

Additional features and advantages of the invention will become apparent to those skilled in the art during the course of the following description.

BRIEF DESCRIPTION OF DRAWING FIGURES

FIG. 1 is a schematic view of circuitry employed in the motor control system embodying the invention.

FIG. 2 is a fragmentary schematic view of a modification or variant in the system.

DETAILED DESCRIPTION

Referring to the drawings in detail, wherein like numerals designate like parts, the circuitry of FIG. 1 is divided into major functional segments for clarity and ease of analysis. Major segments include power semiconductor bridges 10, pulse generator means 20, error comparator/amplifier 30, motor 40 and speed reference circuit 50. Minor segments are the speed feedback circuit 90 linking the motor armature voltage to comparator 30, and IR load compensation circuit 60 linking motor armature current to speed reference circuit 50, which is serially connected to the comparator/amplifier 30. The pulse generator 20 includes a synchronizing or gating subsection 80. A current limiting subsection 70 is included for orientation only and forms no essential part of the present invention. This subsection 70 operates as described in the referenced Wisman U.S. Pat. No. 3,555,386 and will not be further described herein.

The power semiconductor bridges 10 receive power from an AC source 2. Diodes 11 through 12A constitute a bridge for supplying full wave rectified power to the motor field 41 and to the pulse generator 20 through a conductor 15. Diodes 11 and 11A cooperate with controlled rectifiers 13 and 13A to supply adjustable full waved rectified power to the motor armature 42 through conductors 16, 17, 18 and through resistor 4. Resistor 4 develops a voltage proportional to armature current for purposes to be described.

The pulse generator 20 is of the type wherein timing of the pulses is governed by current magnitude in a conductor 21. As illustrated, the current drawn by the collector electrode of comparator transistor 31 charges a capacitor 22. When the charge and voltage across capacitor 22 reaches a critical value, the unijunction transistor 23 conducts, discharging the capacitor 22 through the primary of transformer 24. The transformer secondary windings are connected to the gates of controlled rectifiers 13 and 13A for initiating conduction in the manner well known to those skilled in the art.

A Zener diode 25 maintains the interbase voltage for the unijunction transistor 23 at an appropriate level. Operation of the pulse generator 20 is synchronized with the power supply by means of gating subsection 80 including transistor 81. The transistor 81 is driven into conduction by the base drive supplied from line voltage through resistors 82, 83 and 84. Through most of the power supply cycle, transistor 81 is driven into saturation, but at the end of the cycle, base drive passes through zero and cessation of conduction by transistor 81 removes interbase voltage from the unijunction transistor 23. This removal of interbase voltage causes the capacitor 22 to discharge to a uniform low level for the start of the succeeding half cycle of supplied power. The action of the novel improvements in the gating subsection 80 and its interaction with other circuit segments will be described in greater detail hereinafter.

The error comparator/amplifier circuit 30 responds to a signal from the speed reference circuit 50 through a resistance 8, and compares this signal with a signal representative of motor armature voltage fed through feedback resistor means 90. The positive conductor 17 is the common reference level. The speed reference potential indicative of the desired motor speed is applied to the base electrode of transistor 31, tending to drive it into conduction with increased charging current drawn through capacitor 22 via conductor 21. The increased charging current advances the firing time of the pulse generator 20, increasing the voltage applied to the motor armature 42. The armature voltage signal fed back through resistance means 90 develops a voltage drop across resistances 32 and 33 inserted in the emitter circuit of transistor 31. This potential in the emitter circuit tends to reduce the net base to emitter drive, reducing conduction and causing an equilibrium to be established between a given speed reference signal voltage and a definite motor armature voltage. A capacitor 34 acts to neutralize the effects of feedback ripple, as taught in the referenced Wisman patent, and further coacts with resistance 8 to provide a soft timed ramp start.

The speed reference circuit 50 includes a speed selector potentiometer 51 serially connected between adjustable resistances 53 and 52 for establishing maximum and minimum speed limits, respectively. Resistance 52 connects to the IR load compensation circuit 60 through silicon diode 55 constituting a novel means for achieving basic thermal compensation of the system. The voltage applied to the speed potentiometer serial combination is regulated by Zener diode 54 whose cathode would customarily be returned to the common pulse reference level line 17. It is a novel feature of this invention to achieve certain performance improvements and advantages by connecting it to the IR load compensation circuit 60, to be further described. The speed reference circuit 50 is powered through resistance 7 by the current which traverses unijunction transistor 23 interbases and pulse generator Zener regulator diode 25. In some cases, it may be appropriate to reduce resistance 7 to zero as a matter of design choice.

IR load compensation subsection 60 comprises potentiometers 61 and 62 fed with the voltage developed by armature current traversing resistance 4. Potentiometer 61 is the basic compensation adjustment and under prior art methods, if the Zener diode is returned to common plus, the correction injected is greatest at low speeds and attenuated at higher speeds. If the Zener diode is returned to the wiper of potentiometer 61, the correction injected becomes independent of speed setting. As previously mentioned, the phase control response is inherently less sensitive at high conduction angles and speeds. Furthermore, the motors tend to require different corrections at different speeds in proportions which vary from one design to another. To accommodate these exigencies, programmed IR compensation has been incorporated. This is achieved by introducing a second potentiometer 62 to which the cathode of Zener diode 54 is connected. This permits the amount of compensation effective at high speed to be adjusted independently of the basic or low speed adjustment. Ordinarily, it will be adjusted to accommodate the effects previously mentioned by affording a greater compensation signal on the wiper of potentiometer 62 than that on potentiometer 61 although for particular purposes a different speed/load compensation response could readily be programmed.

It is highly desirable that the motor speed not change as the control heats up or is subjected to varying ambients. In the prior art, it is known to effect compensation by various means including application of temperature-responsive resistance networks or of differential amplifier techniques where control complexity is essentially doubled or duplicated for cancelling thermal effects. It has been found that the principal cause of thermal drift is the inherent property of the base-emitter junction in transistor 31. This junction offset voltage of approximately 0.65 volts decreases with increasing temperature and will of itself cause speed to creep upwardly as the control grows warmer. This effect may be neutralized by inserting a similar semiconductor junction in the speed reference circuit 50 as embodied in silicon diode 55. In operation, when subjected to the same temperature, it reduces speed reference signal voltage by an amount similar to the junction offset change in transistor 31.

In connection with gating circuit subsection 80, as has been explained, its function is to reset the charge in capacitor 22 to a uniform low level at the end of each half cycle of applied power by recognizing zero line voltage crossing. Various means have been employed in the prior art to achieve this synchronizing function in a similar type of apparatus. Commonly, the pulse generator interbase of unijunction transistor 23 is fed with unfiltered rectified power, with gating achieved by natural decay from Zener level established by diode 25 to zero. This is subject to occasional malfunction on interruption of the power supply switch if the contacts grate or bounce in opening. Brief removal or interruption and collapse of interbase voltage of unijunction transistor 23 may cause firing of the pulse generator early in a cycle, resulting in an excessive undisciplined conduction pulse. A similar aberration occurs if the supply power is polluted with ringing disturbances approaching zero instantaneous volts in mid-cycle. Such disturbances are referred to as "notching" and commonly derive from recovery phenomena in the semiconductors of large conversion equipment closely associated on the same power supply mains. These notches are commonly in the order of 15 to 30 microseconds duration. Compatibility is established with polluted power and switching induced malfunction is eliminated through the circuitry shown, wherein capacitor 9 coacts with resistances 5 and 6 to provide a discharge time constant of milliseconds duration for maintaining interbase voltage during switching irregularities. The gating function provided by transistor 81 is rendered immune to notching disturbances by virtue of charge stored in capacitor 85 draining through its associated resistors with a time constant typically in the order of about 100 microseconds. The design and manufacture of this circuit is particularly facilitated and made more commercially practicable by its serial power supply relationship to the speed reference circuit 50. As illustrated, the circuit lead 89 of the pulse generator 20 is maintained at a voltage below common plus reference level on line 17 by the amount of speed reference circuit voltage and the drop in resistor 7, inserted to enhance this differential, which is maintained through the zero crossing gating interval by action of capacitor 9. As zero crossing is approached line voltage drives transistor 81 through resistance 83 or 84 depending on which line is negative, with the positive line effectively connected to common plus line 17 through its diode 11 or 11A. When the line voltage becomes instantaneously less than the value being maintained on circuit lead 89, all possibility of drive vanishes until line voltage sweeps back, irrespective of the values of components 82 through 88. In previous manufacture of similar gating circuits but with parallel feeds for speed reference and pulse generator circuits, the lead 89 is joined to common plus line 17. In this configuration, base drive approaches zero but does not sweep past and therefore components must be selected to very exacting tolerances.

Apart from the particular and unexpected enhancement of gating described in the preceding paragraph, the novel serial power feed configuration of the pulse generator 20 results in less power dissipation and heating in dropping resistor 5 than prevails in the conventional prior art parallel configuration with duplicate dropping resistors.

FIG. 2 of the drawings shows a minor modification of the invention in which the base-emitter junction of a silicon bipolar transistor 55T is utilized instead of the diode 55 in speed reference circuit 50. The purpose of this variant in the circuitry is to achieve symmetry between the transistors 31 and 55T.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A power conversion apparatus comprising, controllable rectifier means, means for regulating the voltage output of said rectifier means responsive to a voltage signal level developed in a reference circuit means, means for developing a voltage signal indicative of said rectifier means load current, said reference circuit means including a resistance means having a first terminal at a potential corresponding to a lesser output voltage and a second terminal at a potential corresponding to a greater output voltage, a first connecting means for connecting said load indicative signal to said first terminal, and a second connecting means for transmitting said load indicative signal to said second terminal.

2. The structure of claim 1 in which said second connecting means includes a Zener diode.

3. The structure of claim 1 in which said means for developing said load indicative voltage signal are plural including a first means yielding a first load indicative voltage signal for application to said first connecting means and a second means yielding a second load indicative voltage signal for application to said second connecting means.

4. The structure of claim 3 wherein said first and second means comprise a pair of potentiometers.

5. The structure of claim 1 in which said resistance means having first and second terminals is a potentiometer.

6. The structure of claim 1 in which said means for developing a signal is a resistance means.

7. A power conversion apparatus comprising, controllable rectifier means, means for regulating the voltage output of said rectifier means, means for producing a voltage reference signal corresponding to a desired output voltage of said rectifier means, means for applying said voltage reference signal to a first terminal of said regulating means, means for applying a signal representative of output voltage developed by said rectifier means to a second terminal of said regulating means, said regulating means including a first semiconductor junction operatively connected between said first and second terminals for responding to differences between signals applied to said terminals, a second semiconductor junction serially connected with said voltage reference signal producing means whereby thermal aberrations of said first semiconductor junction are balanced by said second semiconductor junction.

8. The structure of claim 7 in which said first semiconductor junction is included in a bipolar transistor.

9. The structure of claim 8 in which said second semiconductor junction comprises a silicon diode.

10. The structure of claim 8 in which said second semiconductor junction comprises the base-emitter junction of a silicon bipolar transistor.

11. The structure of claim 7 in which said means for applying said voltage reference signal to a first terminal of said regulating means is a resistance, and said means for applying a signal representative of output voltage developed by said rectifier means to said second terminal of said regulating means is a resistance means.

12. A power conversion apparatus comprising, rectifier means supplied with input voltage through first and second conductors and including controlled rectifier and diode rectifier means interconnecting said first and second conductors to a third output conductor, pulse generator means for firing said controlled rectifier means, regulating means for governing said pulse generator, gating means for synchronizing the pulse generator means with said supplied voltage zero crossing points including stored energy means for bridging brief discontinuities in said supplied voltage, means for supplying operative power to said pulse generator means including stored energy means for sustaining operative power through said zero crossing points of said supplied voltage, means for conducting input voltage present on said first and second conductors to said gating synchronizing means, and means for introducing a potential differential between said gating synchronizing means and said third output conductor whereby said potential differential will insure positive cessation of said supplied voltage conduction to said gating synchronizing means as said supplied voltage traverses said zero crossing points.

13. The structure of claim 12 in which said means for introducing said potential differential comprises a reference voltage circuit included in said regulating means.

14. The structure of claim 12 in which said means for introducing said potential differential includes a resistance.

15. The structure of claim 12 wherein said first and second named stored energy means comprises a pair of capacitors.

16. The structure of claim 12, wherein said means for supplying operative power comprises additional resistance means.

17. The structure of claim 12, wherein said means for conducting said supplied voltage on said first and second conductors to said gating synchronizing means comprises a pair of resistors.

18. The structure of claim 12, wherein said gating synchronizing means includes a bipolar transistor.

19. A power conversion apparatus comprising, controllable rectifier means, pulse generator means coupled with the controllable rectifier means for firing the latter, regulating means for governing said pulse generator means including voltage reference signal means, and circuit means supplying operative power serially to said pulse generator means and said voltage reference signal means.

20. The structure of claim 19, wherein said circuit means includes a diode for neutralizing thermal response of said regulating means.

21. The structure of claim 19, wherein said circuit means includes means for injecting signals representative of output current loading of said power conversion apparatus.

22. The structure of claim 21 and said last-named means for injecting signals including a resistance and a Zener diode.

23. The structure of claim 22 wherein the said resistance is a potentiometer whose wiper is serially coupled to the said Zener diode.

24. The structure of claim 20 wherein the said pulse generator means include stored energy means for bridging brief power supply discontinuities and wherein the said circuit means includes means for injecting signals representative of output current loading of said power conversion apparatus.

* * * * *